United States Patent Office.

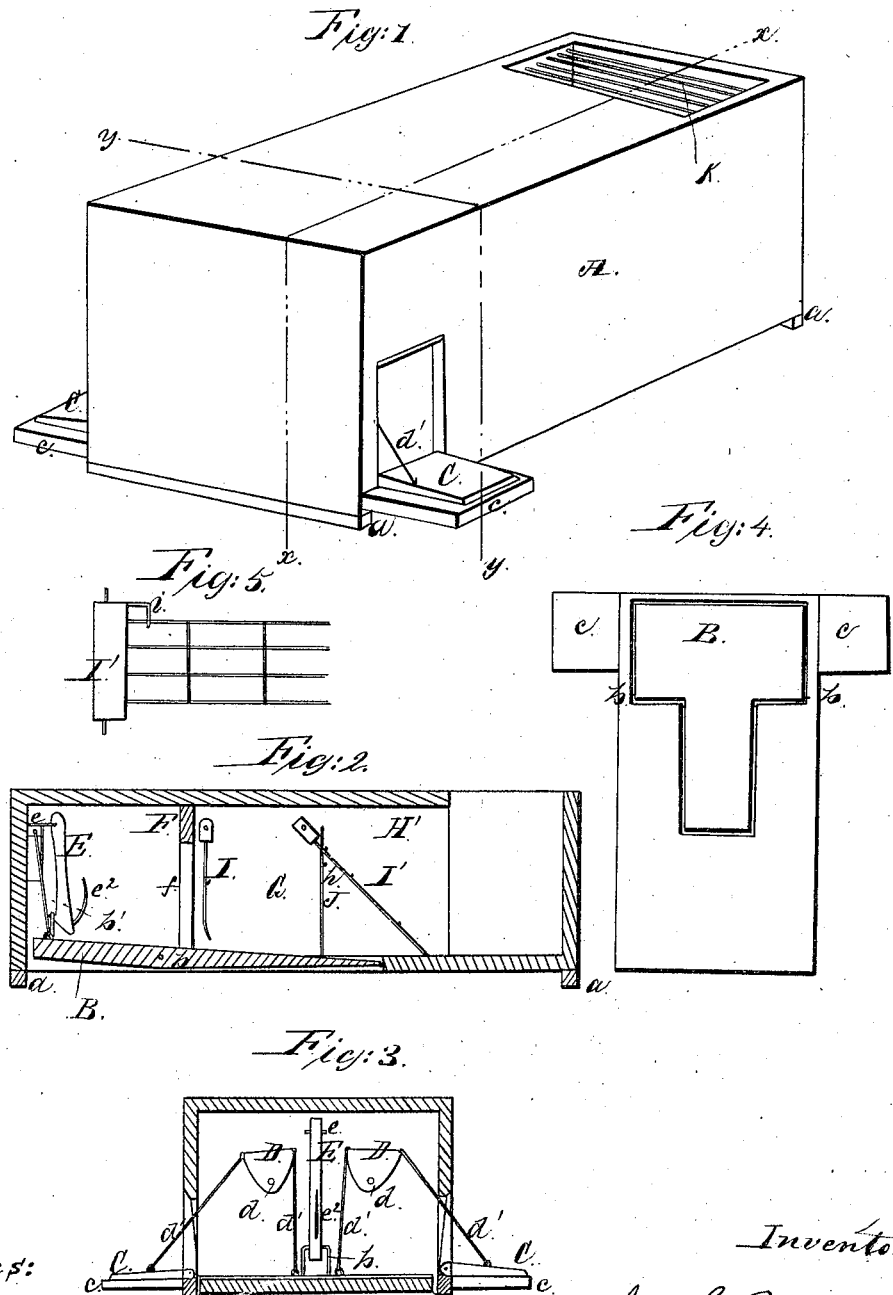

JAMES H. REISINGER, OF VINTON, OHIO.

Letters Patent No. 77,657, dated May 5, 1868.

---

IMPROVED ANIMAL-TRAP.

---

The Schedule referred to in these Letters Patent and making part of the same.

---

TO ALL WHOM IT MAY CONCERN:

Be it known that I, JAMES H. REISINGER, of Vinton, in the county of Gallia, and State of Ohio, have invented a new and improved Animal-Trap; and I do hereby declare that the following is a full and exact description of the same, reference being had to the accompanying drawings, and to the letters of reference marked thereon.

This invention relates to an improved self-setting animal-trap, of novel construction and arrangement, as will be fully described hereinafter.

Figure 1 represents a perspective view of my trap.

Figure 2, a sectional view through the line $x\ x$.

Figure 3, a sectional view through the line $y\ y$.

Figure 4, a plan view of the trap reversed; and

Figure 5, a detached view of the gate I.

In the drawings, A represents a box, of proper shape and size, which is supported upon the bars $a$.

B represents a T-shaped platform, pivoted at $b\ b$, upon which the animal steps.

C C represent entrance-doors in the sides of the trap, which are hinged at the bottom, and open out upon the platforms $c\ c$.

D D represent triangular blocks of wood, pivoted at $d$, and connected, by means of rods, $d'$, with the platform B and doors C C.

E represents a hanging bar, of shape shown, which swings freely upon the rod $e$, and is provided with the bait-hook $e^2$. The lower and inner part of the bar is hook-shaped, and catches into the staple $b'$ of the platform B.

F represents a partition, which extends across the box, as shown, in which is the opening $f$.

G represents a passage-way, formed by partitions H', extending from the opening $f$ a certain distance lengthwise of the trap, in which former are the gates or falls I I'.

These gates are so arranged as to allow the animal to push on into the trap, but entirely prevent any retrograde movement. The first of these gates, I, hangs nearly perpendicular, but the other, I', is inclined at an angle of about forty-five degrees.

The bottom of the passage-way G is formed by the stem of the T-shaped platform.

J represents a rod extending up from the rear end of the stem of the platform, which bears against the bent rod $i'$ in the gate I'. A pin, $h$, in the partition H', assists in guiding the rod J. This arrangement is intended for the purpose of preventing the trap from being reset before the last gate, I', is raised, for the bent-rod $i'$ binds against the rod J, when the gate I' is down, and thus prevents the rear end of the platform from being depressed, but when the gate is raised, the rod J is released from pressure, and the weight of the animal resets the trap.

K represents the rear end of the trap, which is provided with bars, by which means the light is admitted. One or two of these bars may be made loose, in order that the encaged animals may be readily removed when desired.

From this description the operation of my trap will be readily understood.

The trap, having been properly baited, is set by throwing up the platform B until the staple catches in the hook $e^2$. An animal, upon entering the trap, may play around upon the platform with perfect impunity unless he touches the bait. Upon seizing the bait, however, he pulls the catch from the staple, and, consequently, his weight immediately depresses the platform B and closes the doors C C by means of the rods $d'$ and blocks D. Finding his entrance-way entirely closed, the animal naturally springs forward in the direction of the light and pushes up the gate I.

When once started in this direction, he finds return impossible, and is obliged to proceed. In pushing up the last gate, I', however, he releases the rod J from pressure, and the stem of the platform B, being depressed by his weight, the trap is reset.

This operation may be repeated any number of times. If desired, pulleys and cords may be used in place of the rods d' and blocks D. By this construction and arrangement, a simple but extremely efficient self-setting trap is produced.

Having thus fully described my invention, what I claim as new, and desire to secure by Letters Patent, is—

The trap A, having the pivoted platform B, of shape described, doors C C, blocks D, rods d', bait-hook E, arranged as described, passage-way G, gates I I', and rod J, the whole being constructed and operated substantially as described.

This specification signed and witnessed, this fourteenth day of March, 1868.

JAMES H. REISINGER.

Witnesses:
    ROBT. B. CARTER,
    URIAH BOWMAN.